(12) United States Patent
Benantar et al.

(10) Patent No.: US 7,543,147 B2
(45) Date of Patent: *Jun. 2, 2009

(54) METHOD, SYSTEM, AND STORAGE MEDIUM FOR CREATING A PROOF OF POSSESSION CONFIRMATION FOR INCLUSION INTO AN ATTRIBUTE CERTIFICATE

(75) Inventors: Messaoud B. Benantar, Austin, TX (US); Thomas L. Gindin, Potomac, MD (US); James W. Sweeny, Milbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 903 days.

This patent is subject to a terminal disclaimer.

(21) Appl. No.: 10/975,955

(22) Filed: Oct. 28, 2004

(65) Prior Publication Data

US 2006/0095760 A1    May 4, 2006

(51) Int. Cl.
*H04L 9/00* (2006.01)
(52) U.S. Cl. .................. 713/175; 713/155; 713/156; 713/182; 726/5; 726/6; 726/18; 726/27
(58) Field of Classification Search .................. 713/156, 713/175, 182, 186, 157, 155, 193; 726/5, 726/6, 18, 27
See application file for complete search history.

(56) References Cited

U.S. PATENT DOCUMENTS

| 5,166,979 | A  | * | 11/1992 | Takayama et al. ............ 726/19 |
| 6,097,813 | A  |   | 8/2000  | Vanstone et al. |
| 6,510,523 | B1 |   | 1/2003  | Perlman et al. |
| 6,904,523 | B2 | * | 6/2005  | Bialick et al. ............... 713/156 |
| 7,020,778 | B1 | * | 3/2006  | Miettinen et al. ........... 713/182 |
| 7,050,589 | B2 | * | 5/2006  | Kwan ......................... 380/286 |
| 7,139,911 | B2 | * | 11/2006 | Sweeny et al. .............. 713/156 |
| 2002/0073308 | A1 | * | 6/2002  | Benantar .................... 713/155 |
| 2002/0144107 | A1 | * | 10/2002 | Sweeny et al. .............. 713/156 |
| 2002/0144108 | A1 | * | 10/2002 | Benantar .................... 713/156 |
| 2002/0144119 | A1 | * | 10/2002 | Benantar .................... 713/171 |
| 2002/0184182 | A1 |   | 12/2002 | Kwan |
| 2003/0009662 | A1 | * | 1/2003  | Gindin et al. ............... 713/156 |
| 2003/0023848 | A1 | * | 1/2003  | Wray ......................... 713/175 |
| 2004/0039906 | A1 | * | 2/2004  | Oka et al. .................. 713/156 |
| 2004/0039911 | A1 | * | 2/2004  | Oka et al. .................. 713/175 |

* cited by examiner

*Primary Examiner*—Nasser G Moazzami
*Assistant Examiner*—Shanto M Abedin
(74) *Attorney, Agent, or Firm*—Cantor Colburn LLP; William Kinnaman, Jr.

(57) ABSTRACT

A method for creating a proof of possession confirmation for inclusion by an attribute certificate authority into an attribute certificate, the attribute certificate for use by an end user. The method includes receiving from the attribute certificate authority in response to a request by the end user, a plurality of data fields corresponding to a target system, the identity of the end user, and a proof of identity possession by the end user. The method further includes preparing a data structure corresponding to an authorization attribute of the attribute certificate, the data structure including a target system name, the identity of the end user, and the key identifier of the end user. Using a private key associated with the target system, the method includes signing the data structure resulting in a proof of possession confirmation, and sending the proof of possession confirmation to the attribute certificate authority for inclusion into the attribute certificate.

12 Claims, 8 Drawing Sheets

METHOD, SYSTEM, AND STORAGE MEDIUM FOR CREATING A PROOF OF POSSESSION CONFIRMATION FOR INCLUSION INTO AN ATTRIBUTE CERTIFICATE

BACKGROUND OF THE INVENTION

The invention relates generally to information security, and in particular, to a method, system, and storage medium for eliminating password exposure when requesting third-party attribute certificates.

Attribute Certificates (ACs) and Public Key Certificates (PKCs) are used to protect access to electronic information and may be implemented in a variety of applications requiring distributed security such as Internet mail, IPSec, and web applications. While these certificates are structurally similar, one significant difference between the two is that an AC does not contain a public key—instead it normally contains the identity or subject name of a PKC. An AC seeks to certify (i.e., securely bind) a set of authorization capabilities to the AC holder (e.g., group membership, role, security clearance, etc), while a PKC binds a public key to the PKC holder. This authorization information may be placed in either of a PKC extension or the AC; however, it is not generally recommended to place the authorization information into the PKC because the authorization information typically has a shorter lifespan than that of the public key, which may last for years. Thus, when the authorization information changes, the PKC is no longer valid. Further, if the PKC issuer and authorization enterprise are different entities, the PKC issuer would be required to obtain approval from the authorization enterprise before including the authorization information in the PKC, which is inefficient.

When making an access control decision based upon an AC, a verification procedure may be required to ensure that the appropriate AC holder is the entity that has requested access. This verification may be accomplished by establishing a link to a PKC that corresponds to the AC and using a private key associated with the PKC for performing authentication. FIG. 1 illustrates a block diagram of an X.509 AC 102 that is linked to a corresponding X.509 PKC 106 via a holder 104 of the AC 102. X.509 is a standard used to define digital certificates and attribute certificates as recommended by the International Telecommunication Union (ITU), an intergovernmental organization that develops telecommunications technologies. A trust path 110 is established in the AC 102 by tracing back the holder 104 of the AC 102 to the associated PKC 106 during a validation procedure. One attribute of the AC 102 is the Service Authentication Information attribute 108, which is defined by the following ASN.1 syntax:

```
SvceAuthInfo ::=    SEQUENCE {
    service         GeneralName,
    ident           GeneralName,
    authInfo        OCTET STRING OPTIONAL
}
```

The Service Authentication Information attribute 108 is used for packaging a target system name (service) with authentication information such as an identity (ident) and a credential (authInfo). For a legacy application, the identity may be a username and the credential may be password. A target service/system may authenticate the AC holder once it receives the certificate 102 as a result of some type of security protocol between the user and the target service. Such a security protocol would establish the user as the owner of the PKC (e.g., SSL or its successor, TLS). In order to protect the sensitive data upon creation of the AC, the user's credentials information (i.e., SvceAuthInfo) may be encrypted using the public key of the target service. In accordance with the recommendations outlined in RFC3281, the credential information is encrypted by the AC issuer and placed in another attribute called encAttrs prior to inclusion in the AC. In addition to the credential information, the encrypted data would also include the AC issuer's name and AC serial number. This extra information uniquely binds the credential information to the AC containing it. Thus, when evaluating the AC, the target system can verify that the credential information is genuine, and that it has not been stolen from another AC as part of a replay attack.

The following two drawbacks are attributable to the above solution: (1) a potential for password exposure where the AC issuer is a third party; and (2) a change in the password would render the AC unusable. Regarding the first drawback, the above solution would compel the AC issuer and target service/system to be one and the same. If the AC issuer were a third party not having access to the target service/system's credentials database, the AC requester would be required to present the clear text password to the AC issuer when requesting the AC, thus unduly exposing the password to what may not be a trustworthy third party. The credential information cannot be pre-encrypted by the requester prior to requesting the AC, as neither the requester nor the target system would normally know the serial number of a certificate yet to be issued, while the AC issuer should not need to know the password. With respect to the second drawback, since the requester's password is contained in the AC (encrypted), any password change for the requester on the target would render the AC unusable. In fact, any use of the AC after the password change may appear as a break-in attempt.

BRIEF SUMMARY OF THE INVENTION

The above discussed and other drawbacks and deficiencies of the prior art are overcome or alleviated by a method, system, and storage medium for creating a proof of possession confirmation for inclusion by an attribute certificate authority into an attribute certificate, the attribute certificate for use by an end user. The method includes receiving from the attribute certificate authority in response to a request by the end user, a plurality of data fields corresponding to a target system, the identity of the end user, and a proof of identity possession by the end user. The method further includes preparing a data structure corresponding to an authorization attribute of the attribute certificate, the data structure including a target system name, the identity of the end user, and the key identifier of the end user. Using a private key associated with the target system, the method includes signing the data structure resulting in a proof of possession confirmation, and sending the proof of possession confirmation to the attribute certificate authority for inclusion into the attribute certificate.

Further exemplary embodiments include a computer data signal for creating a proof of possession confirmation for inclusion by an attribute certificate authority into an attribute certificate, the attribute certificate for use by an end user. The computer data signal comprises code configured to cause a processor to implement a method. The method includes receiving from the attribute certificate authority in response to a request by the end user, a plurality of data fields corresponding to a target system, the identity of the end user, and a proof of identity possession by the end user. The method further includes preparing a data structure corresponding to an authorization attribute of the attribute certificate, the data structure including a target system name, the identity of the end user, and the key identifier of the end user. Using a private key associated with the target system, the method includes signing the data structure resulting in a proof of possession confirmation, and sending the proof of possession confirmation to the attribute certificate authority for inclusion into the attribute certificate.

Additional exemplary embodiments include a storage medium encoded with machine-readable program code for creating a proof of possession confirmation for inclusion by an attribute certificate authority into an attribute certificate, the attribute certificate for use by an end user. The program code includes instructions for causing a computer to implement a method. The method includes receiving from the attribute certificate authority in response to a request by the end user, a plurality of data fields corresponding to a target system, the identity of the end user, and a proof of identity possession by the end user. The method further includes preparing a data structure corresponding to an authorization attribute of the attribute certificate, the data structure including a target system name, the identity of the end user, and the key identifier of the end user. Using a private key associated with the target system, the method includes signing the data structure resulting in a proof of possession confirmation, and sending the proof of possession confirmation to the attribute certificate authority for inclusion into the attribute certificate.

BRIEF DESCRIPTION OF THE DRAWINGS

Referring now to the drawings wherein like elements are numbered alike in the several FIGURES.

DETAILED DESCRIPTION

Figure 1:
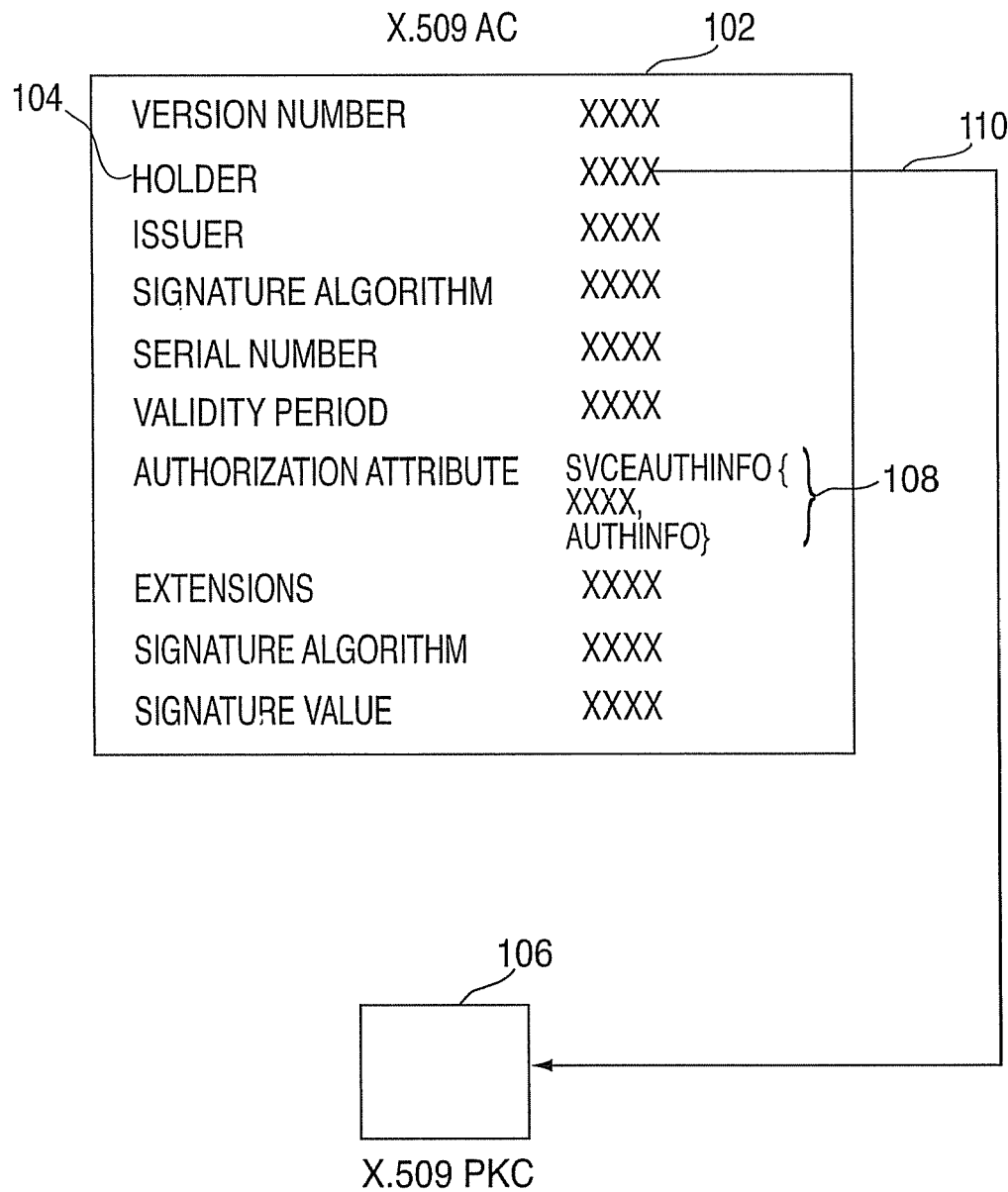
FIG. 1 illustrates representative drawings of an attribute certificate and associated PKI certificate.
Figure 2:
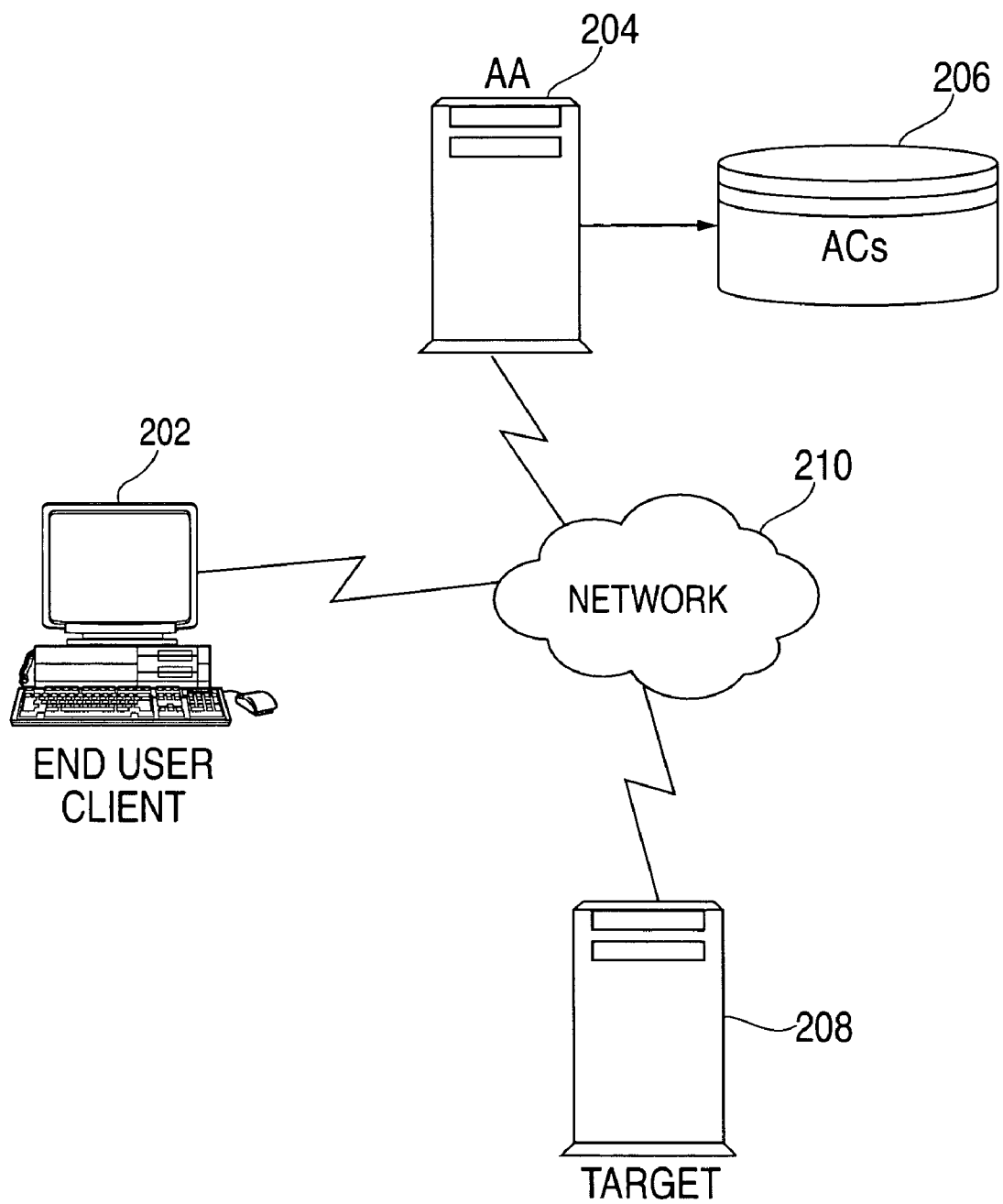
FIG. 2 is a block diagram illustrating the relationship between participating entities in the creation and processing of an attribute certificate in exemplary embodiments of the invention.

Referring initially to FIG. 2, there is shown a system diagram illustrating the relationship between participating entities in the issuance of, and service requests relating to, an AC. An end user client system 202 (also referred to as "end user", "user", or "key holder") has a PKC 106 (FIG. 1) issued by a Certificate Authority (CA) (not shown). End user 202 requests issuance of an AC 102 (FIG. 1) from an Attribute Certificate Authority (AA) 204. End user 202 also requests services (applications, information, etc.) from target system 208. Target system 208 as described herein need not be a single machine, or even a set of machines with a single network interface. Rather, target system 208 is expected to have the property of sharing of non-public key authentication credentials, for some or all of a substantial subset of end users, between nodes within the system of FIG. 2. Target system 208 is defined in RFC3281 4.4.1. In exemplary embodiments, the AC validation is performed in accordance with RFC3281 4.4.1, which is incorporated by reference herein in its entirety. Target system 208 and AA 204 may be part of a single enterprise system whereby AA 204 is considered a highly trusted entity by target system 208. Alternatively, AA 204 may be an external third-party system that is considered to be semi-trusted by the target system 208.

End user 202, AA 204, and target system 208 may communicate with one another via one or more networks (e.g., network 210). Network 210 maybe any type of known network including, but not limited to, a wide area network (WAN), a local area network (LAN), a global network (e.g. Internet), a virtual private network (VPN), and an intranet. The network 210 may be implemented using a wireless network or any kind of physical network implementation known in the art. An end user 202 may be coupled to the target system 208 through multiple networks (e.g., intranet and Internet) so that not all end users are coupled to the target system 208 through the same network. One or more of end users and the target system 208 may be connected to the network 210 in a wireless fashion.

AA 204 processes AC requests in accordance with exemplary embodiments of the invention utilizing the authInfo field of the authorization attribute 108 shown in FIG. 1. The authInfo field, as described in RFC3281, is an optional OCTET STRING that contains the clear text password of a holder. The two drawbacks listed above may be solved separately, and in some cases, together, by expanding on the use of the authInfo field. The authInfo OCTET STRING may be encoded as follows:

```
secureAuthInfo ::= CHOICE {
    sealedPOP           OCTET STRING,
    longSealedPOP       [3] IMPLICIT Enveloped Data,
    aCPOPConfirmation   [6] IMPLICIT SignedData - never
  in request, only in AC
    }
```

A sealedPOP, or "sealed proof of possession" is a mechanism used to protect the target system 208 from a replay attack by an imposter. The requester's password (or other proof of identity) is encrypted or enveloped with a sealedPOP structure. The sealedPOP structure also includes an encryption of the key identifier (keyId) of the certificate request's subjectPublicKey (calculated as the digest of the value of the subjectPublicKey bit string in the certificate referred to by the holder field 104 of the certificate request 102), and various padding. The sealedPOP is prepared by first creating a clearSealedPOP structure with the following steps:

(1) setting the password field to the end user's actual login password on the target system, or to another form of proof of identity possession verifiable by the target system such as a "ticket";
(2) finding the public key certificate referred to by the certificate request
(3) finding the public key certificate's subjectPublicKey;
(4) calculating the key identifier of that subjectPublicKey as the SHA-1 digest of the value of the subjectPublicKey bit string; and
(5) generating a stream of random bytes of binary data and assigning it to the padding field.

The syntax for the clearSealedPOP structure is shown as follows:

```
clearSealedPOP ::= SEQUENCE {
    password ::= CHOICE {
        simple    PrintableString,
        intl      UTFString,
        ascii     IA5String,
        binary    OCTET STRING
    },
    keyId       KeyIdentifier, -- from RFC2459
    padding     [0] IMPLICIT OCTET STRING OPTIONAL
}
```

Once the clearSealedPOP is prepared, the sealedPOP is created by encrypting the clearSealedPOP using the target system's public key. Again, the encryption may be accomplished asymmetrically, resulting in a sealedPOP. Or, if done symmetrically (enveloped) in PKCS #7 or Cryptographic Message Syntax format so that the encrypted symmetric key can only be read by the host, then the result is a longSealedPOP. In any case, the sealed proof of possession is sent to the AA 204 as part of the certification request. The sealedPOP may then be placed in the AC as a result of the request as described further herein. These sealedPOP, longSealedPOP, and clearSealedPOP structures are described in U.S. patent application Ser. No. 09/862,797, entitled "Password Exposure Elimination for Digital Signature Coupling With A Host Identity", filed on May 22, 2001 by the assignees of the above invention, and incorporated by reference herein its entirety.

The encoding of the SvcAuthInfo structure is signed by a target system to produce the above aCPOPConfirmation structure and is provided below:
signedContent::=SvceAuthInfo—with authInfo set to the keyId Turning now to FIG. 3, a process for creating an AC whereby AA 204 is highly trusted and target system 208 is available for password confirmation at the time the AC is requested will now be described. The process described in FIG. 3 assumes that the AA 204 is part of the target system's 208 trusted computing base. Users of the target system 208 request ACs from the AA 204 before requesting services from the target system. At step 302, AA 204 receives a request for an AC from end user client system 202. The user authenticates to the AA 204 via SSL with client authentication (or similar protocol). In other words, the end user presents a valid PKC. The user also presents the target system credential information, i.e., the username/password pair.

Upon receiving the AC request, the AA 204 prepares a clearSealedPOP structure containing the password as supplied by the user and the KeyId calculated on the public key from the user's PKC. This clearSealedPOP structure is then encrypted either asymmetrically using the target system's 208 public key to produce a sealedPOP structure or symmetrically (enveloped) using PKCS #7 (Cryptographic Message Syntax) to produce a longSealedPOP structure at step 304. Either way, the clearSealedPOP data would only be recoverable by the target system 208. The AA 204 would then forward this encrypted structure and the username value to the target system 208 for verification at step 306.

Upon receiving the information for verification, the target system 208 directly (or indirectly if enveloped) recovers the clearSealedPOP data using its own private key at step 308. For example, the recovery may be implemented by either (1) decrypting the ciphertext directly with the host system's private key, or (2) if enveloping is used, by first decrypting the symmetric key with the host system's private key and then decrypting the ciphertext with the decrypted symmetric key. The authenticity of the user name/password pair is then checked against the target system's credentials database at step 310. Additionally, the target system establishes the absence of a replay attack by verifying that the key identifier matches that of the certificate subject public key.

If the authenticity check reveals no match, a message may be delivered indicating that the data is invalid at step 312 and the request is terminated at step 314. If the authenticity check is successful at step 310, the target system 208 prepares a SvceAuthInfo structure containing the name of the target system 208 (service), the user name value (ident), and the KeyId (authInfo) at step 316. The encoding of this SvceAuthInfo structure is signed by the target system 208 using the target system's 208 private key to produce the aCPOPConfirmation at step 318. The encoding may be performed using Distinguished Encoding Rules (DER), a standard used for encapsulating data in a platform independent way. DER encoding is often used for data requiring a digital signature and will be understood by those skilled in the art. The aCPOPConfirmation is returned to a database 106 of the AA 204 for inclusion in the AC at step 320.

Once the aCPOPConfirmation is returned to the AA 204, the AA 204 copies the service and ident fields from it to the corresponding fields in the to-be-created SvceAuthInfo attribute of the AC at step 322. The aCPOPConfirmation itself would be used as the CHOICE value for secureAuthInfo, which, once DER encoded, would become the authInfo OCTET STRING for the svceAuthInfo attribute. The rest of the AC would be prepared as per RFC3281 at step 324 and issued to the user at step 326. The end user 202 may now request services from the target system 208.

Figure 3:
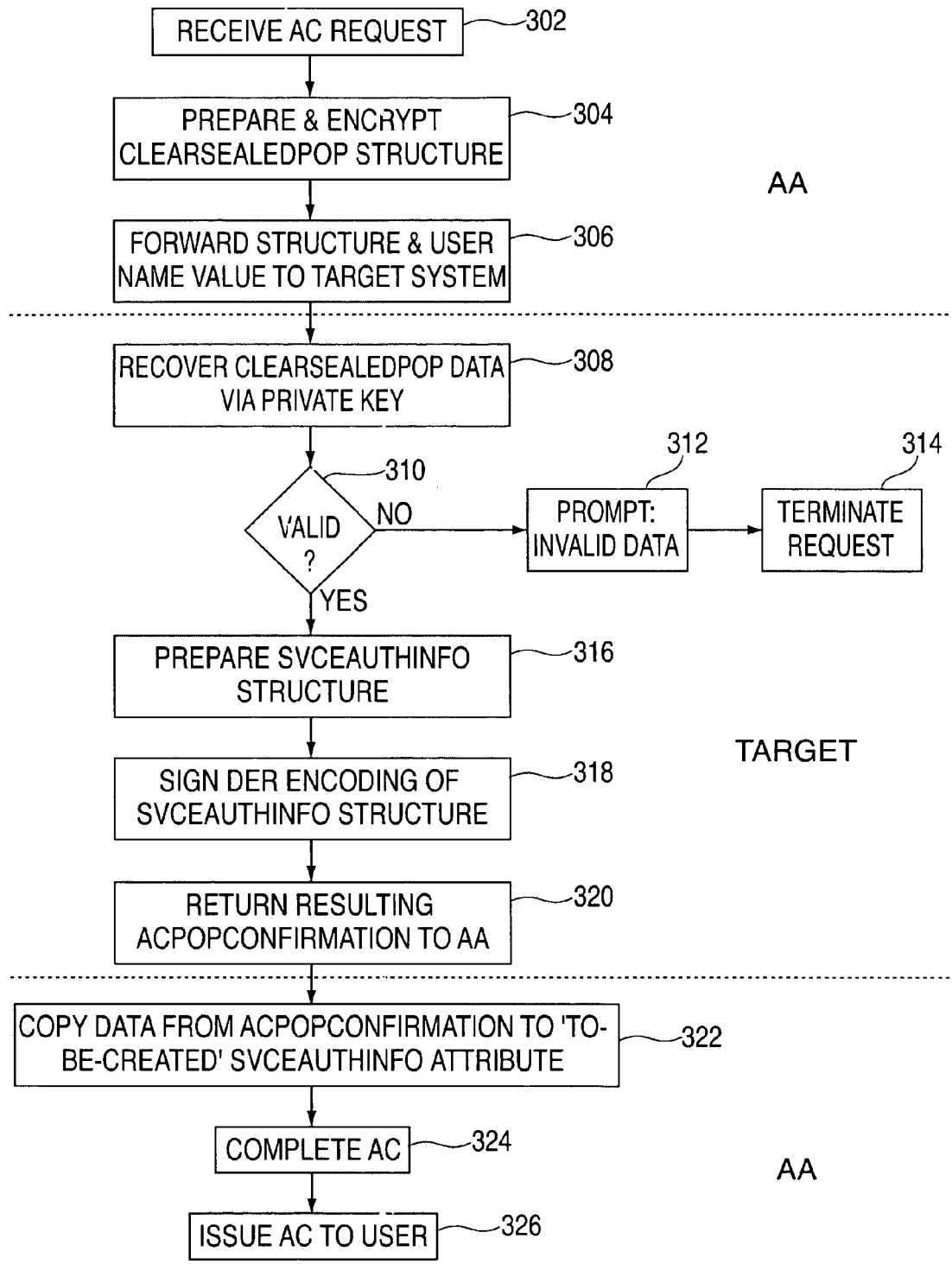
FIG. 3 is a flow diagram illustrating a method for processing an AC request where an attribute authority is highly trusted and a target system is available for password confirmation at the time of the AC request, in accordance with a first embodiment of the invention.

The end user 202 requests a service from the target system 208 in accordance with the embodiment described in FIG. 3. The service request process will now be described with respect to FIG. 4. The target system 208 receives the request for services at step 402. This step involves authenticating the user to the target system 208 via SSL with client authentication (or similar protocol). In this case, the PKC must be the same as the one used when requesting the AC, or at least have the same public key as the original. The target system 208 performs a validation of the AC at step 404. In exemplary embodiments, the AC validation is performed in accordance with RFC3281 5. If the AC is not valid, at step 406, an error message may be delivered to the requester at step 412. If the AC is valid at step 406 and it contains a svceAuthInfo attribute with a secureAuthInfo-aCPOPConfirmation structure, the target system 208 performs a signature check on the aCPOPConfirmation SignedData using the target system's 208 public key at step 408. If the signature is not valid at step 410, an error message is sent at step 412. If the signature is valid, the target system 208 is assured that the aCPOPConfirmation data is genuine. The target system 208 then checks to ensure that the user is indeed the person who requested the AC originally at step 414. This is performed by comparing the keyId from the aCPOPConfirmation against the keyId calculated on the public key from the user's PKC. If they are not the same (invalid) at step 416, an error message is delivered at step 412. If valid, the secureAuthInfo validation process is complete. The target system 208 uses the ident value from the aCPOPConfirmation to create a security context for the user (i.e., login the user) at step 418.

It will be appreciated from the above that since the user's password is not actually stored in the AC, any password change for the user on the target system 208 would not render the AC unusable. Thus, the above method solves the second drawback above. However, it does not solve the first drawback stated above as the requester is still required to present the clear text password to the AA 204. The process described below in FIGS. 5 and 6 addresses the deficiencies of the first drawback.

Figure 5:
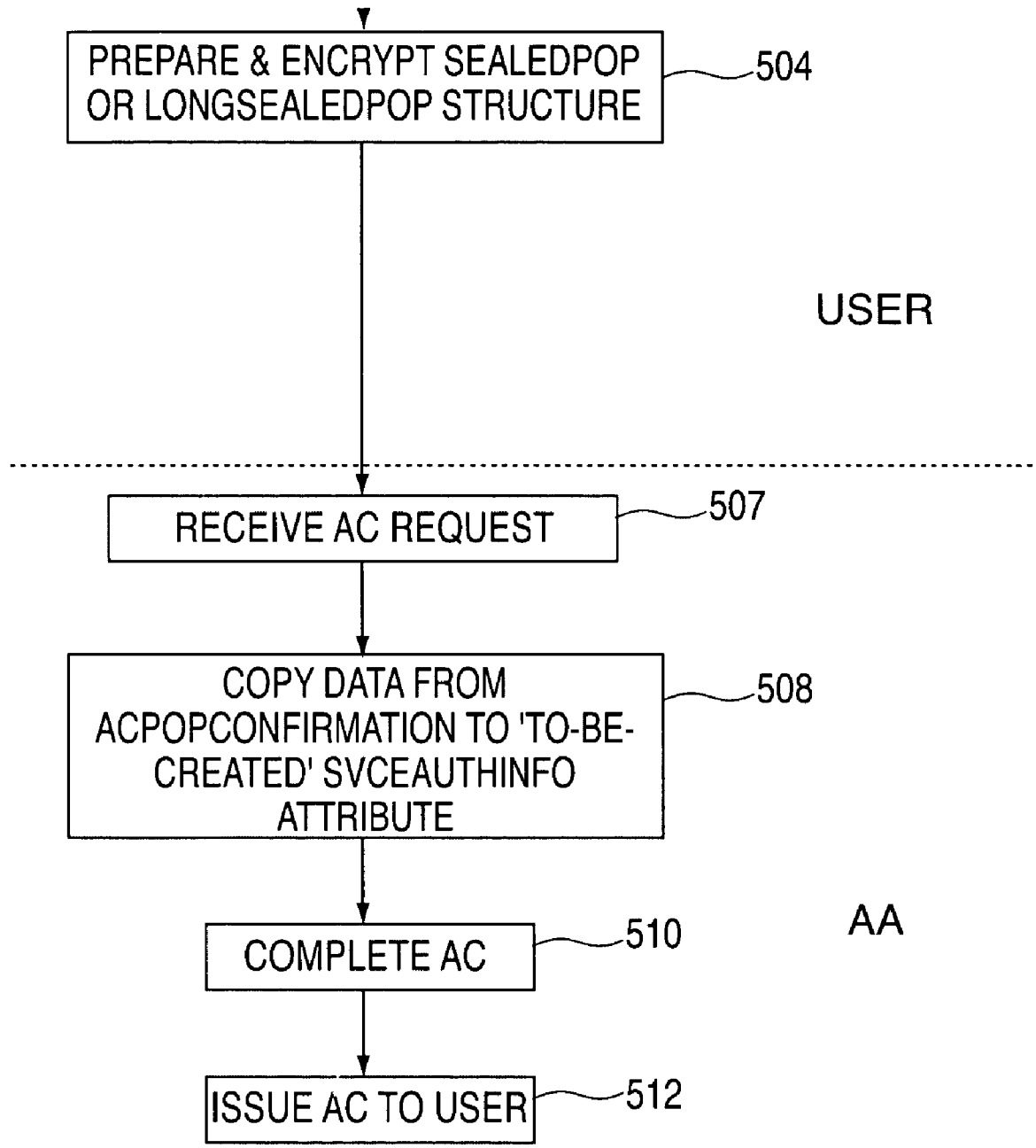
FIG. 5 is a flow diagram illustrating a method for processing an AC request where an attribute authority is semi-trusted and a target system is not available at the time of the AC request, in accordance with a second embodiment of the invention.

Turning now to FIG. 5, a process for creating an AC whereby AA 204 is semi-trusted and target system 208 is not available for password confirmation at the time the AC is requested. The process described in FIG. 5 assumes that the AA 204 is operated by an external third party. Users of the target system 208 would request ACs from the AA 204 before requesting services from the target system 208. Since the AA 204 is not part of the target system's 208 trusted computing base, it is not desirable to send the user's password to the AA 204 when requesting the AC. In order to avoid sending the password to the AA 204, the user (not the AA 204) creates either the sealedPOP structure or longSealedPOP structure as described in 304 of FIG. 3 prior to requesting the AC at step 504. At step 507, AA 204 receives a request for an AC from end user client system 202. The user authenticates to the AA 204 via SSL with client authentication (or similar protocol). In other words, the user must present a valid PKC. The sealedPOP or longSealedPOP structure is submitted to the AA 204 along with the user's target system username as part of step 507.

Upon receiving the AC request from the user, the AA 204 builds the to-be-created SvceAuthInfo attribute from the information supplied at step 508. The sealedPOP or longSealedPOP structure is used as the CHOICE value for secureAuthInfo, which, once DER encoded, becomes the authInfo OCTET STRING for the SvcAuthInfo attribute. The rest of the AC is prepared as per RFC3281 at step 510 and issued to the user at step 512.

Figure 6:
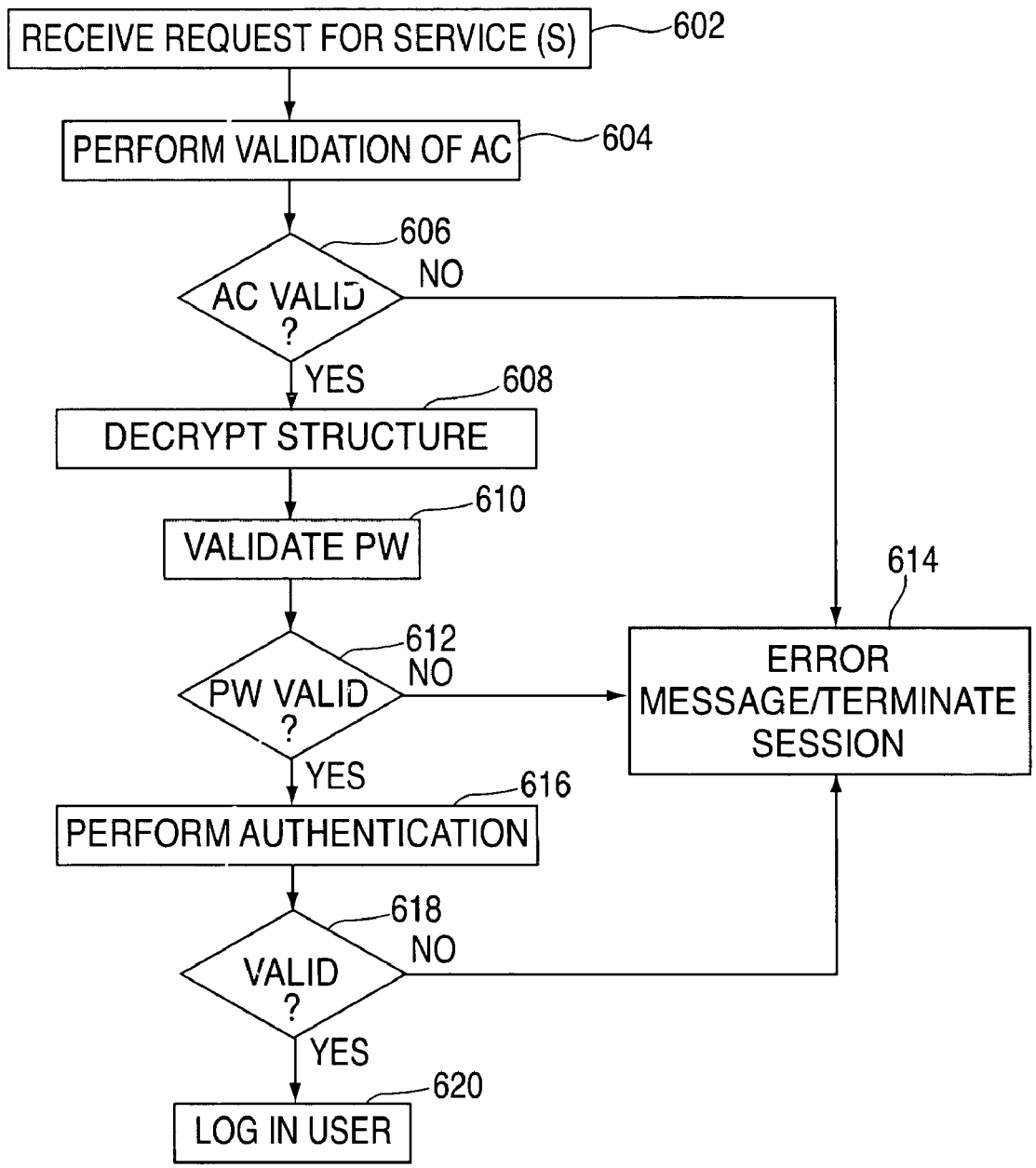
FIG. 6 is a flow diagram illustrating a method for processing a request for services in accordance with the embodiment described in FIG. 5.

The user requests services from the target system 208, in accordance with the embodiment described in FIG. 5, as will now be described in the process of FIG. 6. The target system 208 receives the request for services at step 602. This step involves authenticating the user to the target system 203 via SSL with client authentication (or similar protocol). In this case, the PKC must be the same as the one used when requesting the AC, or at least have the same public key as the original. The target system 208 performs a validation of the AC at step 604. In exemplary embodiments, the AC validation is performed in accordance with RFC3281 5. If validation is unsuccessful at step 606, an error message is delivered and the session is terminated at step 614. If the AC is valid and it contains a secureAuthInfo-sealedPOP or longSealedPOP structure, the structure is decrypted to recover the clearSealedPOP and thus the clear text password and KeyId at step 608. The clear text password is validated as ident's password at step 610. If successful at step 612, the keyId from the clearSealedPOP is compared against the keyId calculated on the public key from the user's PKC to ensure that the user is indeed the person who originally requested the AC at step 616. If they are the same at step 618, the secureAuthInfo validation process is complete. The target system 208 would then use the ident value from the SvceAuthInfo attribute to create a security context for the user (i.e., login the user) at step 620. It will be appreciated that since the password is not exposed to the third party AA 204, problem 1 above is solved. However, since the AC contains the password, problem 2 is not solved. A password change for the user on the target system 208 would render the AC unusable.

Both of the above-stated drawbacks may be resolved by combining properties of both the processes described above in FIGS. 3 and 5. The following scenario assumes that the AA 204 is semi-trusted and the target system 208 is available for password confirmation at the time of the AC request. The process is implemented as described in FIG. 3, except the user (not the AA 204) creates the sealedPOP or longSealedPOP structure as described in FIG. 5. The AA 204 forwards this information to the target system 208 for verification. Upon receiving the information for verification, the target system 208 follows the procedure outlined in FIG. 3 to recover the clearSealedPOP, check the authenticity of the username/password pair, check the keyId, and (if successful) build the aCPOPConfirmation to be returned to the AA 204. The building of the AC from the aCPOPConfirmation and the use of the AC by the user is the same as described in FIG. 3 and FIG. 4 respectively. Both problems 1 and 2 are solved because the password is not exposed to the AA 204 and the AC would survive a password change.

Figure 7:
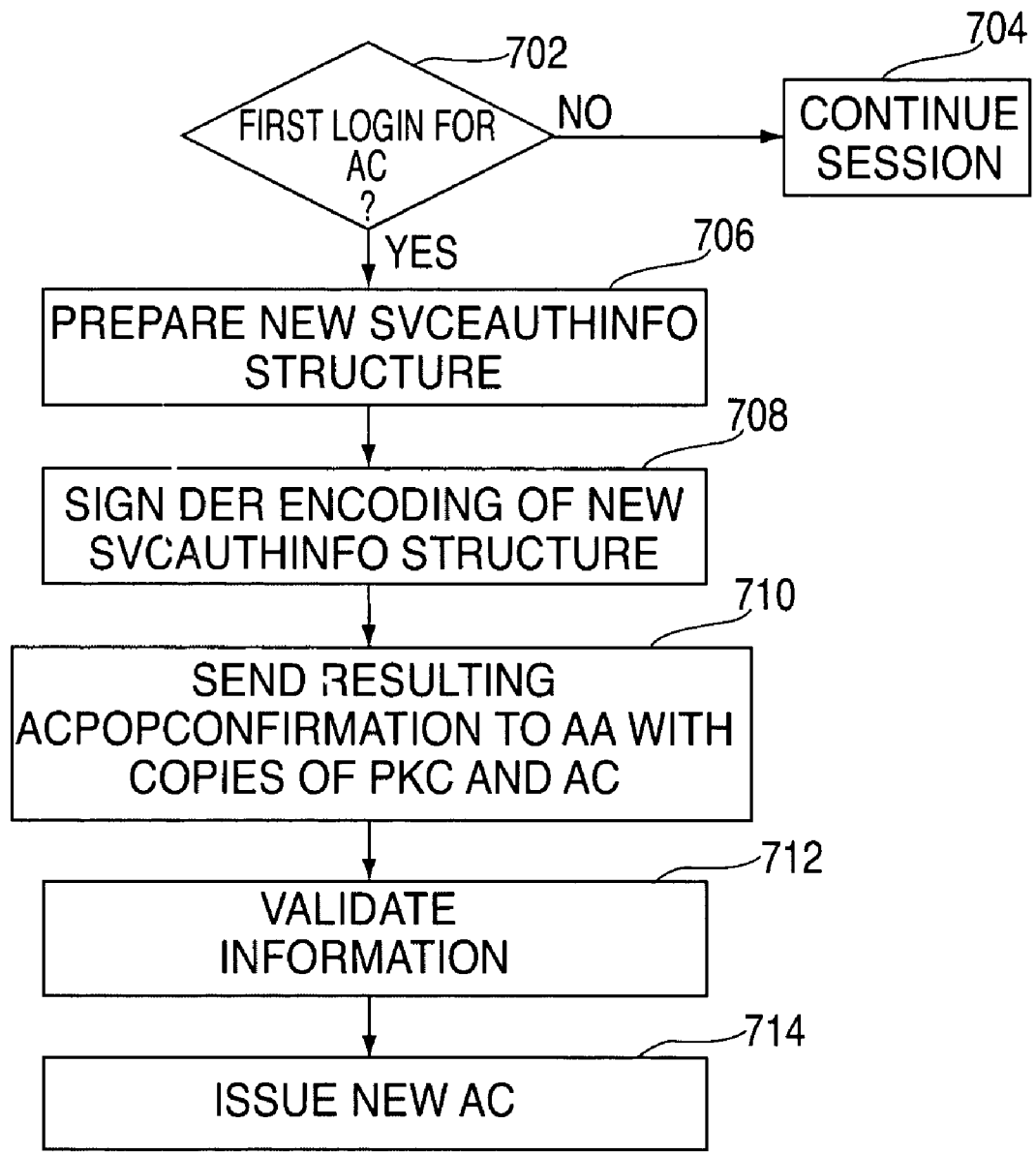
FIG. 7 is a flow diagram illustrating a method for triggering an upgrade for an AC by a target system in accordance with the embodiment described in FIG. 5.
Figure 8:
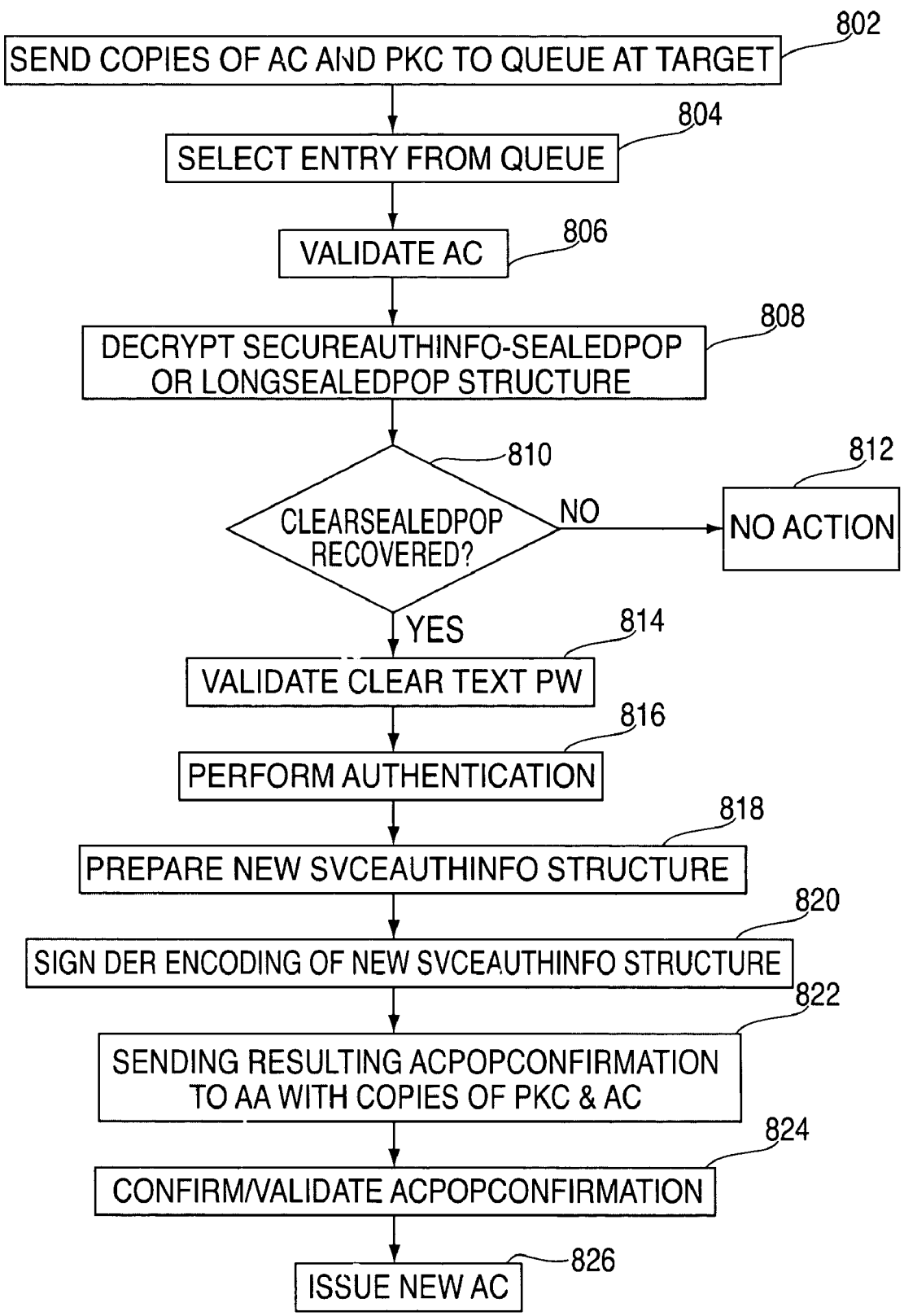
FIG. 8 is a flow diagram illustrating a method for triggering an asynchronous upgrade for an AC by a target system in accordance with the embodiment described in FIG. 5.

Upgrades may be implemented for ACs issued by the AA 204. FIG. 7 describes a process for upgrading an AC that is triggered by the target system 208 upon login and is a continuation of the process described in FIGS. 5 and 6. FIG. 8 describes a process for upgrading an AC that is asynchronously triggered by the target system 208 and is a continuation of the processes described in FIGS. 5 and 6.

Turning now to FIG. 7, the AA 204 issues an AC containing a sealedPOP or longSealedPOP structure and the user later uses it to log in. When the target system 208 creates its security context for the user (after validation as described by FIG. 6 has completed successfully), it then checks to see that this is the first login attempt with the AC at step 702. If not, the session continues as usual at step 704. If it is the first login attempt, the target system 208 prepares a new SvceAuthInfo structure containing the name of the target system 208 (service), the username value (ident), and the keyId (authInfo) at step 706. The DER encoding of this SvceAuthInfo structure would be signed by the target system 208 (using the target system's private key) to produce the aCPOPConfirmation at step 708. This aCPOPConfirmation would be sent to the AA 204 along with copies of the PKC and the AC at step 710.

The AA 204 confirms that the key ID of the PKC matches that in the aCPOPConfirmation, and that the existing AC refers to the PKC at step 712, before issuing any new AC. When the AA 204 receives the message containing these three items, the AA 204 can issue a new AC whose AttributeCertInfo is the same as the previous AC's except for the following differences: serialNumber is changed, attrCertValidityPeriod.notBeforeTime is updated to the current time (although attrCertValidityPeriod.notAfterTime is unchanged), and SvceAuthInfo is updated to replace the sealedPOP or longSealedPOP by the aCPOPConfirmation at step 714.

Figure 4:
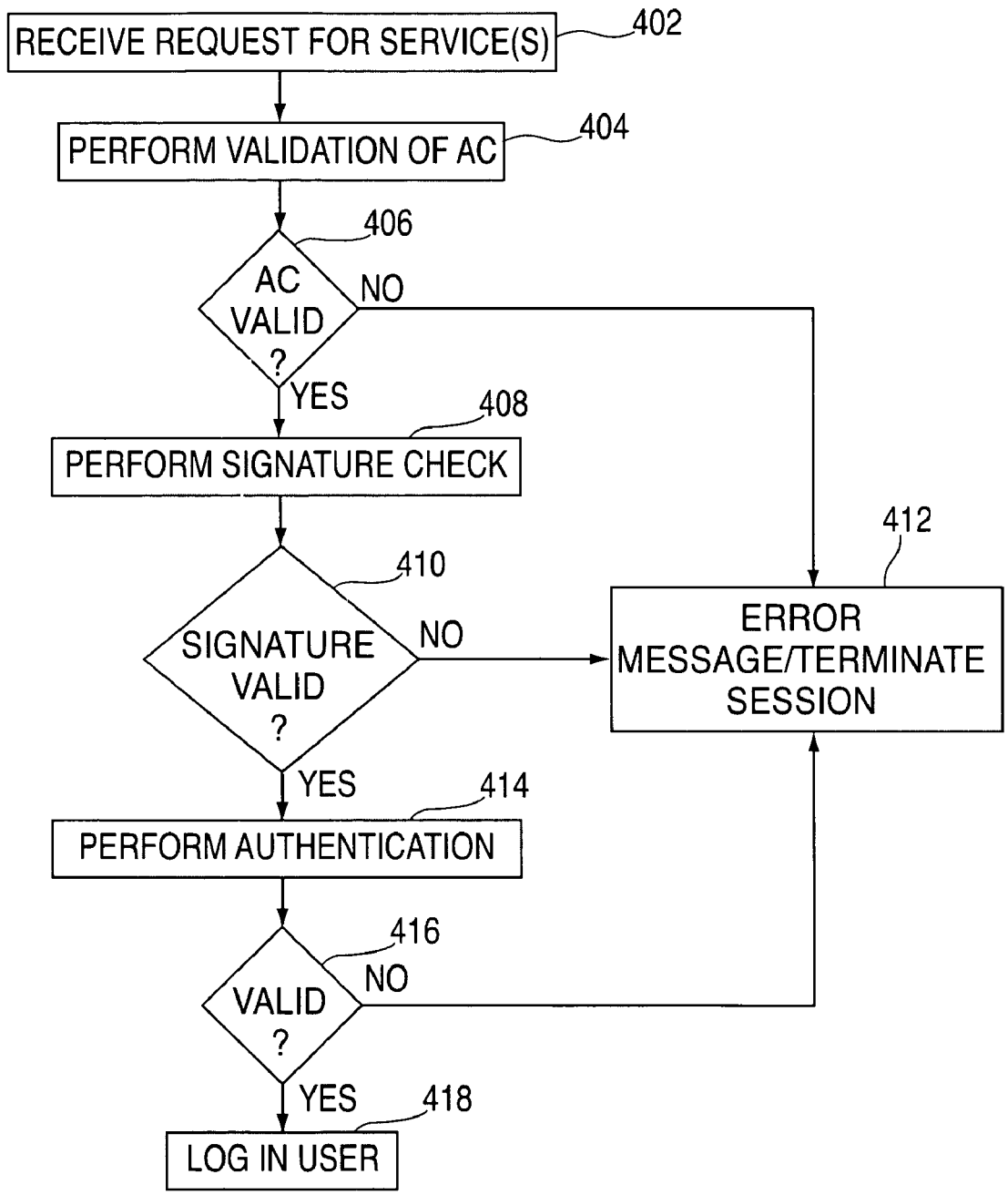
FIG. 4 is a flow diagram illustrating a method for processing a request for services in accordance with the embodiment described in FIG. 3.

It will be appreciated that this process permits a target system 208 to migrate the ACs issued as a result of the embodiment described in FIG. 4 to the ACs issued as a result of the embodiment described in FIG. 3, which are unaffected by password changes. The new AC may be distributed to the subject in any of a variety of standard ways. In particular, the new AC may be returned to the subject in the course of a session with the target system 208, sent by email (encrypted or clear), and placed in a directory, FTP site, or Web site, to name a few.

Turning now to FIG. 8, a process for upgrading an AC that is asynchronously triggered by the target system 208 will now be described. The AA 204 issues an AC containing a sealed-POP or longSealedPOP structure and sends a copy of it, along with the corresponding PKC, to a queue or repository belonging to the target system 208 at step 802. When the target system 208 is underloaded, it then processes an entry from this queue or repository at step 804. The target system 208 validates the AC at step 806 and decrypts the secureAuthInfo-sealedPOP or longSealedPOP structure to recover the clearSealedPOP and thus the clear text password and KeyId at step 808. If there is no clearSealedPOP recovered at step 810, no action is taken at step 812.

If a clearSealedPOP is recovered at step 810, the clear text password is validated as ident's password at step 814, and then, to ensure that the user is indeed the person who requested the AC originally, the keyId from the clearSealed-POP is compared against the keyId calculated on the public key from the user's PKC at step 816. If they are the same, the target system 208 then prepares a new SvceAuthInfo structure containing the name of the target system 208 (service), the user name value (ident), and the keyId (authInfo) at step 818. The DER encoding of this SvceAuthInfo structure is signed by the target system 208 (using the target system's private key) to produce the aCPOPConfirmation at step 820. This aCPOPConfirmation would be sent to the AA 204 along with copies of the PKC and the AC at step 822.

The AA 204 confirms that the key ID of the PKC matches that in the aCPOPConfirmation, and that the existing AC refers to the PKC at step 824, before issuing any new AC. When the AA 204 receives the message containing these three items, the AA 204 issues a new AC whose AttributeCertInfo is the same as the previous ACs except for the following differences: serialNumber is changed, attrCertValidityPeriod.notBeforeTime is updated to the current time (although attrCertValidityPeriod.notAfterTime is unchanged), and SvceAuthInfo is updated to replace the sealedPOP or long-SealedPOP by the aCPOPConfirmation at step 826.

It will be appreciated that this process permits a target system to migrate ACs issued as a result of the process described in FIG. 5 to ACs issued as a result of the process described in FIG. 3, which are unaffected by password changes. The new AC may be distributed to the subject in any of a variety of standard ways. In particular, the new AC may be returned to the subject in the course of a session with the target system, sent by email (encrypted or clear), and placed in a directory, FTP site, or Web site.

Note that by the inclusion of the AC requester's key identifier in any of the forms of the (now secure) authInfo, the POP information is cryptographically bound to the requester's PKC. Thus, the SvceAuthInfo attribute need not be further bound to the AC to prevent replay. Hence, the SvceAuthInfo is not to be included in the encAttrs attribute when building the AC.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for creating a proof of possession confirmation for inclusion by an attribute certificate authority into an attribute certificate, the attribute certificate for use by an end user, the method comprising:

receiving, from the attribute certificate authority in response to a request by the end user, a plurality of data fields corresponding to a target system, the identity of the end user, and a proof of identity possession by the end user;

preparing a data structure corresponding to an authorization attribute of the attribute certificate, the data structure including a target system name, the identity of the end user, and the key identifier of the end user, the data structure prepared by expanding the authorization information field of the attribute certificate via an OCTET STRING corresponding to the authorization information field;

using a private key associated with the target system, signing the data structure resulting in a proof of possession confirmation;

sending the proof of possession confirmation to the attribute certificate authority for inclusion into the attribute certificate; and processing a copy of an attribute certificate stored in a queue associated with the target system, upgrading the attribute certificate, the upgrading asynchronously triggered by the target system when the target system is underloaded.

2. The method of claim 1, further comprising:
validating the plurality of data fields prior to preparing the data structure.

3. The method of claim 1, wherein the proof of identity possession is encrypted by the end user where the attribute certificate authority is not part of a trusted computing base associated with the target system, the end user encrypting the proof of identity possession at the time of the request.

4. The method of claim 1, wherein the proof of identity possession is encrypted by the attribute certificate authority where the attribute certificate authority is part of a trusted computing base associated with the target system, the attribute certificate authority encrypting the proof of identity possession at the time of the request.

5. A computer processing system for creating a proof of possession confirmation for inclusion into an attribute certificate, the attribute certificate for use by an end user, the computer processing system comprising:

a computer processor; and logic executing on the computer processor, the logic performing:

receiving, from an attribute certificate authority in response to a request by the end user, a plurality of data fields corresponding to a target system, the identity of the end user, and a proof of identity possession by the end user;

preparing a data structure corresponding to an authorization attribute of the attribute certificate, the data structure including a target system name, the identity of the end user, and the key identifier of the end user, the data structure prepared by expanding the authorization information field of the attribute certificate via an OCTET STRING corresponding to the authorization information field;

using a private key associated with the target system, signing the data structure resulting in a proof of possession confirmation;

sending the proof of possession confirmation to the attribute certificate authority for inclusion into the attribute certificate; and processing a copy of an attribute certificate stored in a queue associated with the target system, upgrading the attribute certificate, the upgrading asynchronously triggered by the target system when the target system is underloaded.

6. The computer processing system of claim 5, wherein the logic further implements:

validating the plurality of data fields prior to preparing the data structure.

7. The computer processing system of claim 5, wherein the proof of identity possession is encrypted by the end user where the attribute certificate authority is not part of a trusted computing base associated with the target system, the end user encrypting the proof of identity possession at the time of the request.

8. The computer processing system of claim 5, wherein the proof of identity possession is encrypted by the attribute certificate authority where the attribute certificate authority is part of a trusted computing base associated with the target system, the attribute certificate authority encrypting the proof of identity possession at the time of the request.

9. A storage medium encoded with machine-readable program code for creating a proof of possession confirmation for inclusion by an attribute certificate authority into an attribute certificate, the attribute certificate for use by an end user, the program code including instructions for causing a computer to implement a method, the method comprising:

receiving, from the attribute certificate authority in response to a request by the end user, a plurality of data fields corresponding to a target system, the identity of the end user, and a proof of identity possession by the end user;

preparing a data structure corresponding to an authorization attribute of the attribute certificate, the data structure including a target system name, the identity of the end user, and the key identifier of the end user, the data structure prepared by expanding the authorization information field of the attribute certificate via an OCTET STRING corresponding to the authorization information field;

using a private key associated with the target system, signing the data structure resulting in a proof of possession confirmation;

sending the proof of possession confirmation to the attribute certificate authority for inclusion into the attribute certificate; and processing a copy of an attribute certificate stored in a queue associated with the target system, upgrading an attribute certificate, the upgrading asynchronously triggered by the target system when the target system is underloaded.

10. The storage medium of claim 9, further comprising instructions for causing the computer to implement:

validating the plurality of data fields prior to preparing the data structure.

11. The storage medium of claim 9, wherein the proof of identity possession is encrypted by the end user where the attribute certificate authority is not part of a trusted computing base associated with the target system, the end user encrypting the proof of identity possession at the time of the request.

12. The storage medium of claim 9, wherein the proof of identity possession is encrypted by the attribute certificate authority where the attribute certificate authority is part of a trusted computing base associated with the target system, the attribute certificate authority encrypting the proof of identity possession at the time of the request.

* * * * *